United States Patent [19]

Borak

[11] 4,389,977
[45] Jun. 28, 1983

[54] WATERING VALVE-BRACKET FOR RABBITS AND SMALL FUR BEARING ANIMALS

[76] Inventor: Josef Borak, 34985 Hallert Rd., Matsqui, B.C. V0X 1S0, Canada

[21] Appl. No.: 290,327

[22] Filed: Aug. 5, 1981

[51] Int. Cl.³ .......................... A01K 7/06; F16K 1/12
[52] U.S. Cl. .................................. 119/72.5; 251/339
[58] Field of Search ..................... 119/72.5, 75, 18; 248/215, 311.3, 311.2; 251/339

[56] References Cited

U.S. PATENT DOCUMENTS

| | | | |
|---|---|---|---|
| 3,385,267 | 5/1968 | Boegli et al. | 119/72.5 |
| 3,589,338 | 6/1971 | Lovitz | 248/311.3 |
| 3,590,781 | 7/1971 | Spencer | 119/72.5 |
| 3,602,197 | 8/1971 | Fioretto | 119/72.5 |
| 3,707,949 | 1/1973 | Lippi | 119/18 |
| 3,750,628 | 8/1973 | Schumacher | 119/72.5 |
| 3,750,706 | 8/1973 | Mallinson | 119/72.5 |
| 3,756,199 | 9/1973 | Clark | 119/72.5 |
| 4,184,450 | 1/1980 | Atchley et al. | 119/18 |
| 4,258,666 | 3/1981 | Edstrom | 119/72.5 |

FOREIGN PATENT DOCUMENTS 9664  4/1909  United Kingdom ............... 248/215

*Primary Examiner*—Paul J. Hirsch

[57] ABSTRACT

A watering or drinking device for small animals includes a drinking valve operable by an animal and a hanger bracket attacheable anywhere on a wire cage. The device includes an actuating pin held within the valve cavity by a flexible retainer plug. The lower portion of the retainer plug is seated on a shoulder provided in the valve cavity and prevents liquid to pass through the valve. Lateral pivotal movement or axial movement of the actuating pin which is seated on a second shoulder provided in the valve cavity and in contact with the retainer plug, will cause the lower portion of the retainer plug to be unseated from the said shoulder and allow liquid to pass through the valve. The wing clip of the valve-bracket has a vertical slit and allows the device to fit either between two vertical wires of a wire cage or over one vertical wire of a wire cage. The wing clip includes horizontal recesses to embrace a horizontal wire of a wire cage to hold the valve-bracket securely in a desired position on a wire cage.

6 Claims, 6 Drawing Figures

WATERING VALVE-BRACKET FOR RABBITS AND SMALL FUR BEARING ANIMALS

FIELD OF THE INVENTION

My invention relates to a watering valve embodying an integral adjustable bracket for allowing easy access to water for rabbits and other small animals of all ages while eliminating difficulties apparent when other similar devices are used.

BACKGROUND OF THE INVENTION

At the present time several types of watering valves for rabbits and other animals such as cavies, and birds are available as disclosed in U.S. Pat. No. 3,563,264 issued to C. P. Boegl on Feb. 16, 1971 or U.S. Pat. No. 3,128,745 issued to R. Alter on Apr. 14, 1964. Separate means for attaching the watering valves onto a cage housing such animals are also available and disclosed in Canadian Pat. No. 849845 issued to V. Lorenzen on Aug. 25, 1970 or U.S. Pat. No. 3,707,949 issued to D. M. Lippi on Jan. 2, 1973. Other valves and clips for attaching the valves onto a cage performing the same function as my valve-bracket are readily available, but to the best of my knowledge such devices are either complex and therefore subject to malfunction, or they are machined from expensive materials and therefore too costly, or they fail to achieve the objective of providing clean water to small animals of all ages normally housed in wire cages, or such devices cause excessive amounts of labour and other costs to be expended in the maintentance of the cages. It should be understood that fur bearing animals such as rabbits and the like require clean dry cages to prevent excessive bacterial contamination and resulting high mortality rate. Furthermore, even a small amount of moisture on the walls and floor of a cage will cause the animal's feet to become wet and hair covering the animal's feet will become less resilient causing injury to the animal's feet usually resulting in a disease generally referred to as "sore hocks". In addition some valves require certain water pressure in the main water supply line to keep the valve closed or alternatively some valves require a spring or other object using gravity to press upon a seal to prevent the valve from releasing water when not activated by the animals.

SUMMARY OF THE INVENTION

The valve-bracket of my invention consists of only three elements, two of which, the outer valve-bracket body 1A, and the retainer plug 8, are injection moulded elements, and a stainless steel activating pin 6 is a cold headed element and therefore all the said three elements are inexpensive to produce.

Furthermore the optimal simplicity of all the elements assures a consistently reliable functioning of the valve even at zero pressure in the main water supply line. Another advantage of my valve-bracket invention is the elimination of wet wire normally caused by excess water escaping while the animals drink.

Watering means that embody a valve located inside of a cage or a valve attached to a cage by means of a bracket any portion of which extends below a point of the valve whereat the excess water leaves the valve, will cause wet cage wire in the immediate vicinity of the valve location. Airborne hair from fur bearing animals will adhere and accumulate on the said wet portion of the wire cage causing health hazards to the animals and a great increase in maintenance labour cost due to the need of frequent cage cleaning.

The valve-bracket of my invention has no element of the watering device below or under the lowermost point 20 whereat any excess water leaves the valve.

One object of my invention is to provide a simple watering valve easily operable by the smallest animals or birds at varying water pressures or at no pressure at all.

Another object of my inventon is to provide, low cost watering valve requiring no other means for attaching same to a wire cage.

Still another object of my invention is to provide a watering valve attacheable to a wire cage fabricated from any size of wire mesh. Another object of my invention is to provide watering valve with means for attaching same to the outside of a wire cage in any location thereon and without any tools.

A further object of my invention is to prevent excess water to come in contact with any other part of the device or with any portion of the wire cage the device is attached to.

These and other objectives will readily be apparent from the following description and drawings.

DETAILED DESCRIPTION

Figure 1:
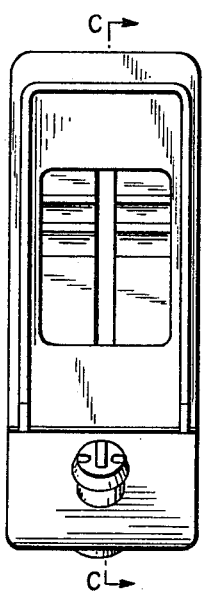
FIG. 1 is a rear view of the valve-bracket.
Figure 2:
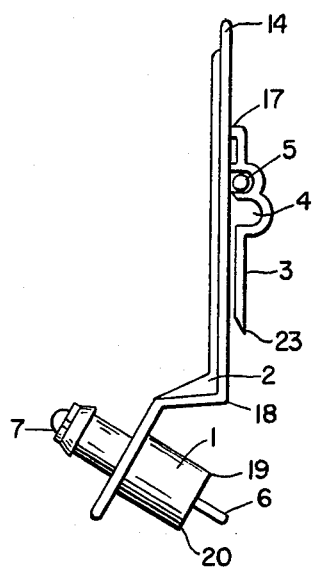
FIG. 2 is a side elevation of FIG. 1.
Figure 3:
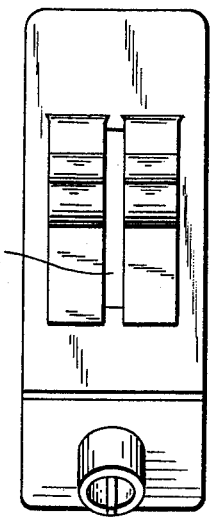
FIG. 3 is a front view of the valve-bracket.
Figure 6:
FIG. 6 is a top view of the retainer plug 8 of FIG. 5.
Figure 5:
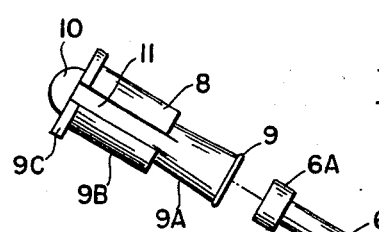
FIG. 5 is an exploded view of FIG. 4.
Figure 4:
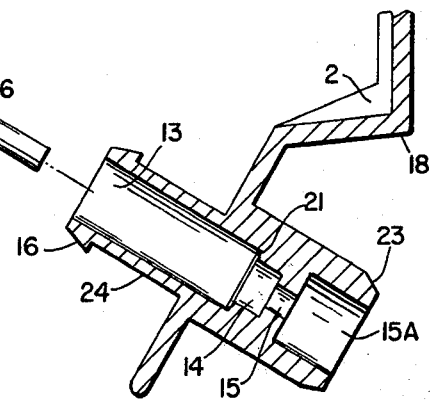
FIG. 4 is a cross section of the valve taken along the line C—C of FIG. 1 looking towards the arrows.
Figure 4:
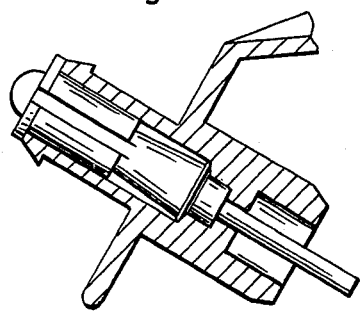

The illustrated valve-bracket FIG. 2 consists of a plastic one piece moulding, which embodies main frame 1A, reinforcing ribs 2, two clip wings 3 which extend from point 17 downward and form two rounded recesses to embrace and accommodate one horizontal wire 5, which is part of the wire cage mesh.

Lower portion 23 of the valve-bracket embodies the valve cavity enclosure 1 where the outer points 19 and 20 do not extend beyond point 18. The opposite end of the valve cavity enclosure terminates with enlarged rim 16. The valve-bracket cavity 14 contains head 6A of activating pin 6 manufactured from stainless steel or other suitable hard and noncorrosive material. The activating pin 6 extends through opening 15 and through external opening 15A to the outside of the valve bracket cavity and terminates at a point not exceeding point 18 of the valve-bracket moulding.

Retainer plug 8 is manufactured from soft, flexible material such as organic rubber or organic or synthetic plastisizer or similar compounds, and is fitted into cavity 13. Lower half 9A of the retainer plug 8 is conical in section with a slightly larger base 9 which is seated against shoulder 21 of cavity 13. Upper body 9B of retainer plug 8 fits tightly against walls of cavity 13. Upper rim 9C is slightly enlarged and fits against the uppermost edge of the valve-bracket cavity enclosure. Two water access slots 11 are provided in the retainer plug upper portion 9B. Finger grip protrusion 10 forms the upper extremity of the retainer plug.

The foregoing description is illustrative only of mechanism restricting the flow of water through a valve cavity enclosure by means of two elements and of attaching the said valve cavity enclosure to a cage. The activating pin 6, for example, may be alternatively constructed with a thin flat head or with a rounded head, or the valve cavity enclosure may be separate from the means of attaching same to a wire cage with its external physical shape moulded to conform with physical shape of other existing means for attaching same to a cage or connecting same to the main water supply line. The upper portion 24 of the valve cavity enclosure 1 may, for example, be suitably threaded for direct attachment to the main water supply line as is customary in some poultry watering installations.

To assemble my device, the activating pin 6 is dropped into cavity 13. The activating pin head 6A will rest in cavity 14 and will be retained therein by insertion of retainer plug 8. Slight pressure will be exerted by the flexible retainer plug through its base 9 on the cavity shoulder 21. To install my device anywhere on a cage the valve-bracket is slipped over any horizontal wire of a cage at point 23 and pulled down until the said horizontal wire is firmly seated in either of the two recesses 4. The two clip wings 3 may fit between two vertical wires of a wire cage and on a small size wire mesh a vertical wire of the wire cage may be fitted into slot 22 located between the two wings. Flexible tubing of suitable length is connected between the main water supply line generally installed along the upper edge of the cages and the upper extremity of the valve body, fitting over the enlarged rim 16 of the upper part 24 of the valve cavity enclosure. To obtain water the animal touches the protruding lower end of the activating pin 6 which in turn lifts the enlarged base 9 of the plug 8 and causes water to flow through the valve.

I claim:

1. A watering valve-bracket comprising
a valve body including a first cavity and an opening and a valve hanger bracket, said valve bracket and said valve body being formed as one piece,
said valve body including a first and a second internal shoulder,
said first shoulder providing a mounting seat for an enlarged head portion of an actuating pin located at a bottom portion of the valve body and extending through said opening, a flexible retainer plug adapted to substantially fit inside said first cavity having a top end and a bottom end and including a first and a second portion, said first portion being substantially uniform in diameter, said second portion having a generally conical shape, said second portion having a first diameter less than said diameter of said first portion and extending away from said first portion to an enlarged flexible base portion having a second diameter larger than said first diameter,
said retainer plug sized to frictionally engage the inside walls of said first cavity and said enlarged base portion engaging said second shoulder spaced above said first shoulder in a top portion of said valve body, said retainer plug further including at least one fluid passage extending axially along the circumferential surface of said top end,
whereby when an upward force is applied against said pin, said pin engages and unseats said base portion allowing fluid flow through said at least one fluid passage.

2. A watering valve-bracket as in claim 1, said hanger bracket including means for attaching said valve-bracket to a cage.

3. A watering valve-bracket as in claim 2, wherein said cage is a wire cage.

4. A watering valve-bracket as in claim 3, wherein said means for attaching said valve-bracket includes at least one wing clip having at least one recess formed therein for embracing a horizontal wire of said cage.

5. A watering valve-bracket as in claim 4, further comprising two wing clips and having a vertical slot therebetween.

6. A watering valve-bracket as in claim 2, wherein said valve body and said hanger bracket are formed in such a manner such that the activating pin is substantially aligned below the means for attaching said valve-bracket.

* * * * *